United States Patent Office 3,530,026
Patented Sept. 22, 1970

3,530,026
APPARATUS FOR FILAMENT WINDING OF ARTICLES IN REINFORCED SYNTHETIC RESIN
Frank Hanslow Proctor, Patrick Alfred Emmett, and Frank Hayling, Gloucester, England, assignors to Gloster Saro Limited, Gloucester, England, a British company
Filed July 20, 1966, Ser. No. 566,525
Claims priority, application Great Britain, July 21, 1965, 31,122/65
Int. Cl. B65h 81/04
U.S. Cl. 156—425        12 Claims

ABSTRACT OF THE DISCLOSURE

A winding machine is disclosed for the manufacture of large hollow vessels by laying resin-soaked reinforcing filaments on to a former. The former rotates about a horizontal axis and a traversing carriage is reciprocating along side it to lay up the resin-soaked filaments. The drive ratio between the former rotation and the carriage traverse is adjustable, and the final drive element to the carriage is an endless chain which is adjustable in length. The filaments are supplied from cheeses carried on end in individual compartments upon a platform of a carriage. Each filament passes down through an individual opening in the platform into an individual guide tube that leads it under the carriage platform to a resin soak tank likewise mounted on the carriage.

---

This invention is concerned with the manufacture of large articles in reinforced synthetic resin materials by the technique of winding layers of reinforced filaments soaked in uncured resin onto a former and subsequently curing the resin.

The process of winding, for example, glass fibre filaments soaked in an uncured polyester resin onto a mandrel or former to build up a workpiece, especially a hollow vessel, is well known. However, problems occur in the design of a suitable winding machine when the workpieces involved are large. An instance of a large workpiece arises in the case of the tank shell for a road tanker vehicle. It is an object of this invention to provide, at reasonable cost, an improved winding machine capable of producing such large work.

According to one aspect of the invention, in a winding machine in which a carriage travels to and fro parallel to the axis of a rotating mandrel or former for the purpose of laying resin-soaked reinforcing filaments on to the former in successive layers, the carriage is driven by a drive assembly the speed of which is selectable as regards its ratio to the rotary drive to the former and the final drive element connected to the carriage is an endless chain extending parallel to the carriage travel and of adjustable length.

By this means it becomes possible in a simple way to select any desired shift in the position at which the filaments are laid on, as between one layer of filaments and the next, by inserting additional links from the chain, as will hereafter be more fully explained.

In another aspect, the invention provides for the delivery to a filament soak tank on the carriage of separate balanced feeds from two pressurised storage tanks, one storage tank containing the uncured resin mixed with catalyst and the other containing uncured resin mixed with promoter or accelerator. If the ratio of the feeds is correctly set and both tanks are pressurized from a single gas pressure source it is possible to regulate the supply to the soak tank very simply during working by means of a single valve.

In the preferred arrangement, to prevent tangling of the filaments, the supply cheeses are mounted on end on a floor or platform on the carriage in individual containers and the filaments are led up from the cheeses over guides and then separately down through the floor or platform into individual polythene guide tubes leading the filaments to individual spaced entries to the soak tank.

These and other features will be apparent in the following description of one embodiment, given by way of example and with reference to the accompanying drawings.

Figure 1:
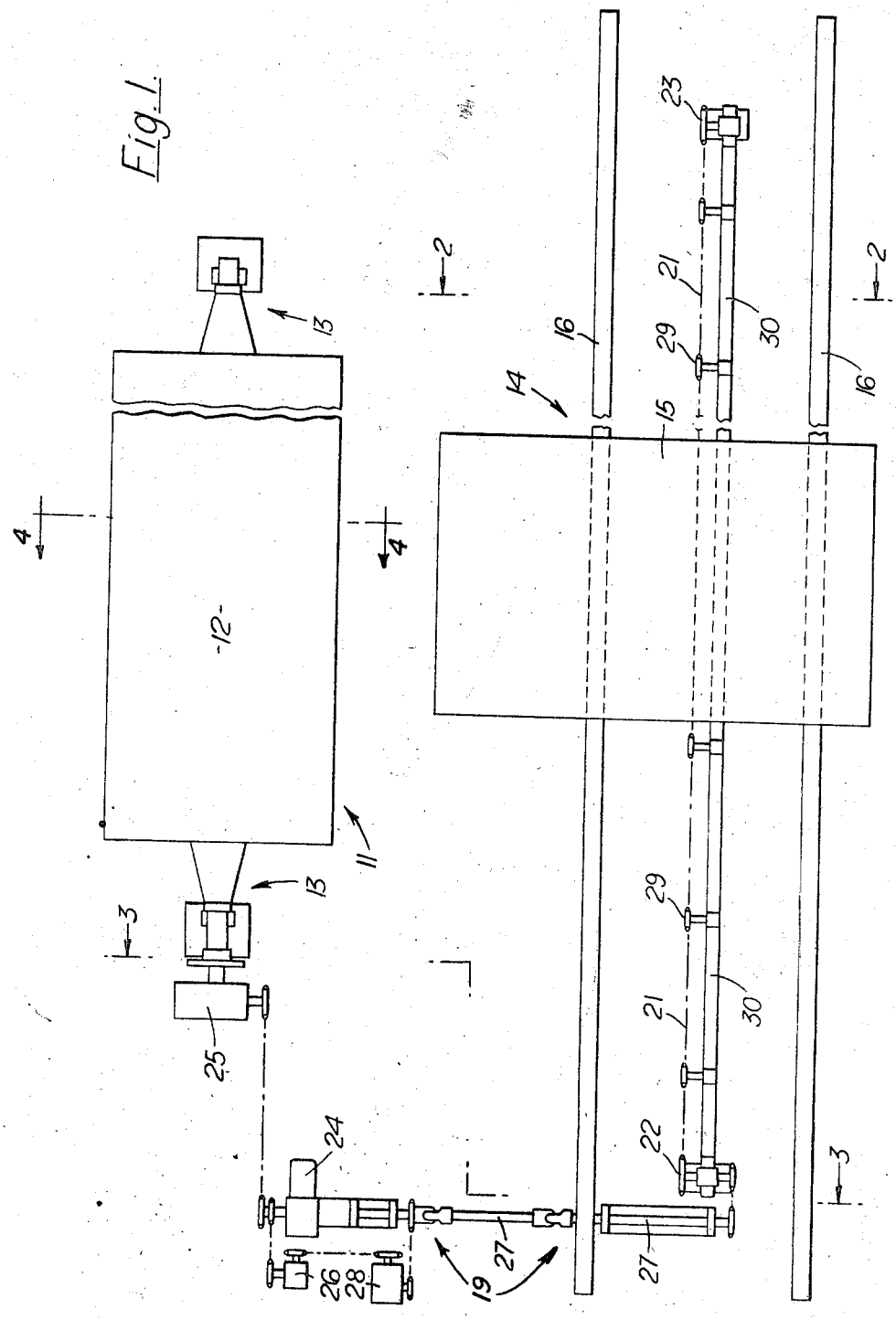
Figure 2:
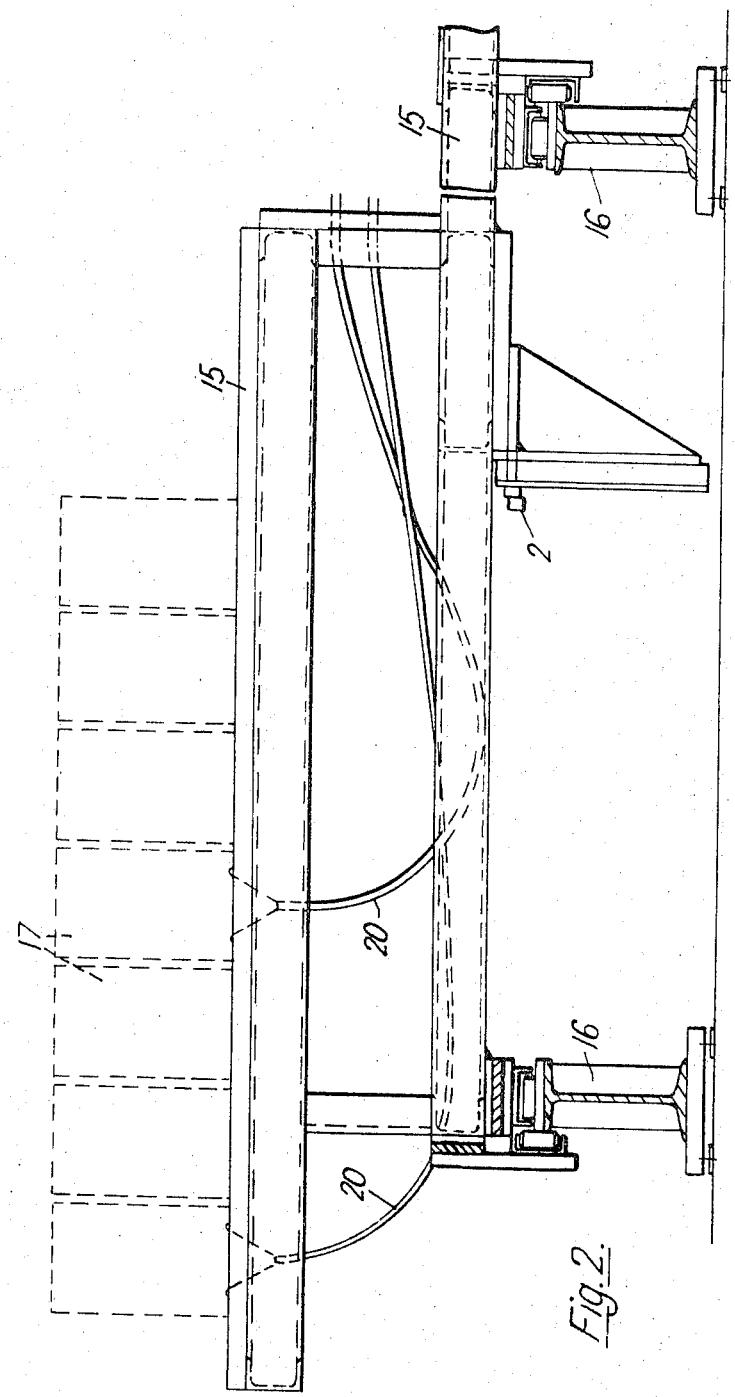
Figure 3:
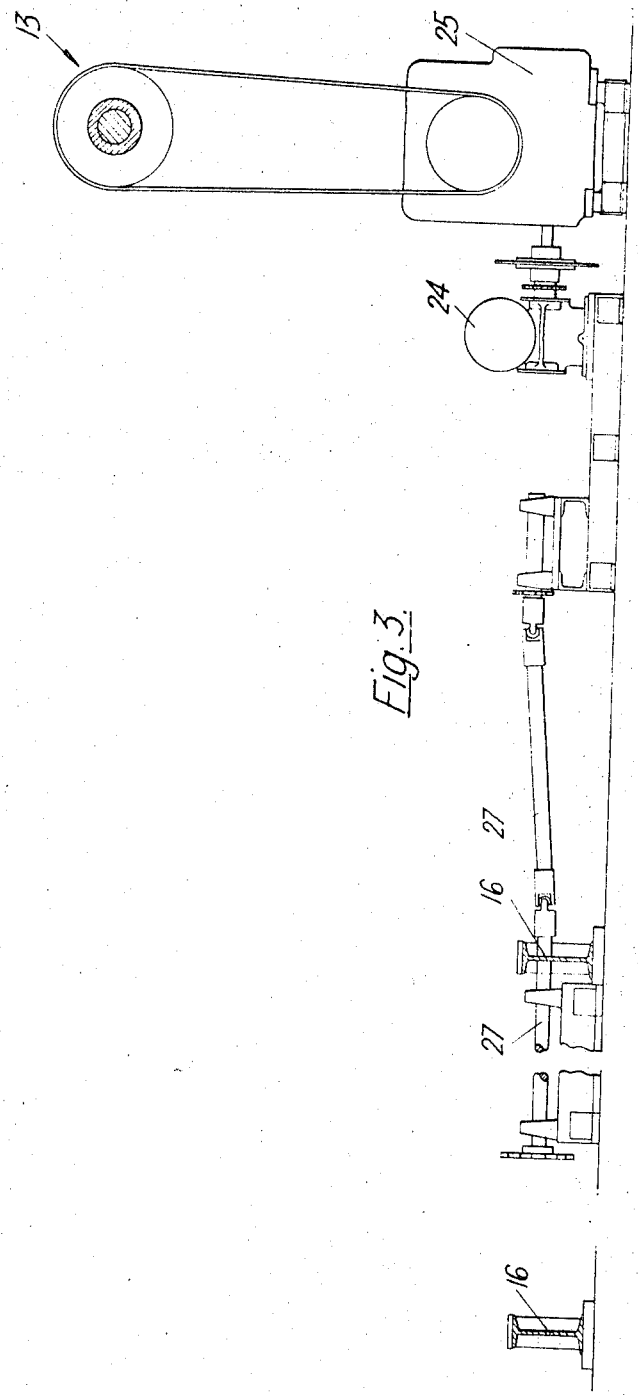
Figure 4:
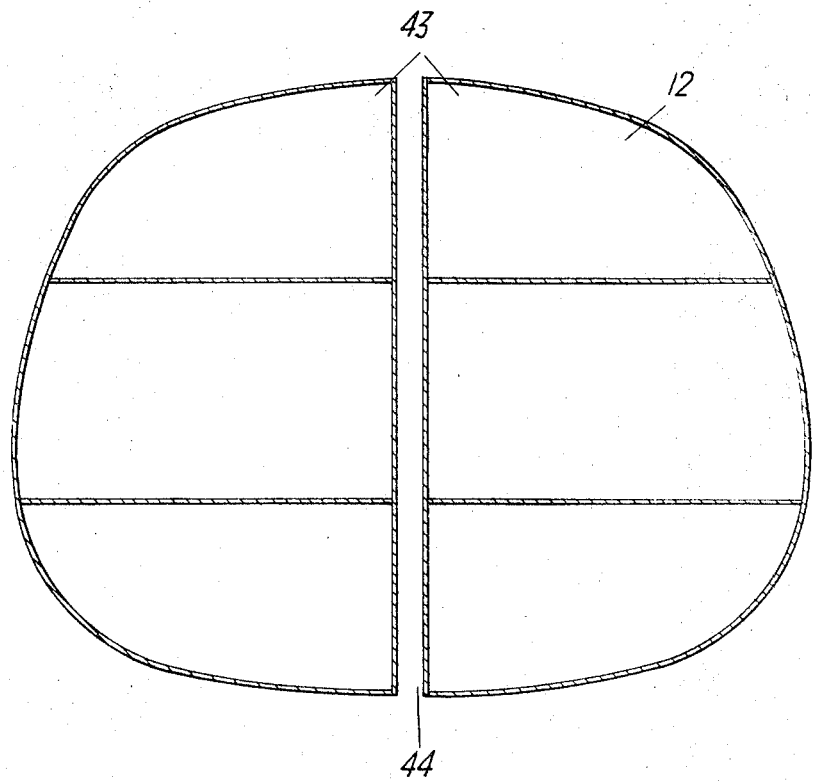
Figure 5:
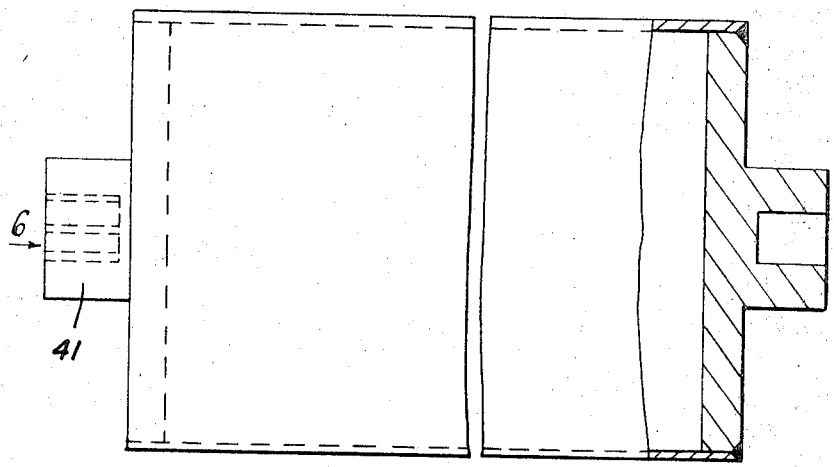
Figure 6:
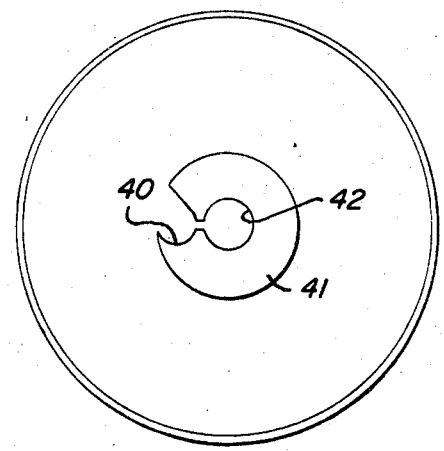

In the drawings:
FIG. 1 is a diagrammatic plan of a machine for winding large hollow articles of glass fibre reinforced synthetic resin.
FIG. 2 is a view on the line 2—2 of FIG. 1,
FIG. 3 is a view on the line 3—3 of FIG. 1,
FIG. 4 is a view on the line 4—4 of FIG. 1,
FIG. 5 shows, in longitudinal view and partly in section, a roller designed to run in the resin soak tank of the machine, and
FIG. 6 is an end view of the roller in the direction of the arrow 6 of FIG. 5.

The machine to be described is primarily for producing tank shells for road tanker vehicles. While in what follows reference will be made to the workpiece being cylindrical, and to coned end pieces, this is merely for convenience and the invention is not limited to work only of a cylindrical character. The workpieces will, in fact, commonly not be of circular cross section nor will they necessarily be of entirely uniform section throughout their length.

The machine to be described (FIG. 1) consists basically of three parts, each of which is bolted separately to the floor. The first part 11 comprises a split mandrel or former 12. The third part 19 consists of the driving mechand bearings 13 on one fixed and one adjustable stand so that it can turn about its longitudinal axis. The second part 14 comprises a carriage 15 capable of travelling in a direction parallel to the longitudinal axis of the former 12 on a pair of rails 16 mounted on the floor. This carriage (FIG. 2) is provided with a supply of suitable fibre glass filaments on cheeses 17 as well as a soak tank containing uncured resin and the necessary means to lead the glass filaments from their individual cheeses through the soak tank and thence to the work being wound on the former 12. The third part 19 consists of the driving mechanism which serves to rotate the former 12 and which also drives the carriage 15 to and fro such that the glass fibre filaments are wound upon the former 12 in a pattern which is controllable with regard to the angle at which the individual fibres are being applied and with regard to the pitch between individual strands being applied to individual layers and also the pitch between any one strand in one layer and its position in the succeeding layer. Provision is made for workpiece of varying diameter and length. For each different workpieces to be produced, if the diameter or the shape of the cross section is different a new former is required, except in the case to be mentioned later herein. As regards changes in length, it would be possible always to wind bodies on a former having the maximum length which can be accommodated on the machine and subsequently to cut back the ends of work required to be shorter than the maximum but this is uneconomical in the use of the materials required. Therefore, the machine is made to accommodate formers of differing lengths. Also there is provision for the former to be fitted with frusto-concial end pieces that permit the windings to fall easily over the end of the main cylindrical body of the former, which has the advantage that upon return of the carriage that portion of the windings which has been laid on the conical end surfaces will prevent the remainder from slipping away from the end. After the workpiece has been completely wound and cured the conical pieces are cut off, and while they obviously form waste this wastage is less than that which would occur if the ends of the former had been left plain.

Owing to the large amount of reinforcing material required in the winding of a workpiece of the size under consideration, the carriage 15 is provided with a considerable number of individual cheeses 17 so as to make it possible to lay on to the work at each revolution up to sixty rovings. Hitherto, it has been the practice to place such cheeses upon horizontal spindles and to permit each cheese to unwind as the filament was drawn from it. With the number of cheeses involved it has been a comparatively frequent occurrence for individual strands to form knots or to become entangled with each other. This has been overcome in the present arrangement by placing the cheeses 17 vertically in individual containers standing on end upon the floor of the carriage. The strands are first led upwards from the bobbins for a matter of about a yard and then they pass over horizontal rods to return down to the carriage floor where each strand enters an individual polythene tube 20. Each tube 20 has one end connected to the carriage floor at a respective floor opening and leads from said floor opening first downwardly under the platform and then turns to extend approximately horizontally toward a respective individual filament entry to the soak tank, the individual filament strands passing through the respective openings in the carriage floor to be received in the individual guide tubes 20. These tubes then guide the strands to a tension-applying brake device which delivers them at one edge of the polyester resin tank which they enter in a single row side by side. This method of freely suspending the glass fibre filaments individually has been found to prevent completely any tendency to form knots. Also, they are sufficiently well placed apart before entering their individual polythene tubes 20 to prevent any possibility of entanglement of one strand with another.

With regard to soaking the filaments with the uncured polyester resin the following method is employed. The resin may be mixed either with catalyst or with promoter (also sometimes called accelerator) without obtaining a mixture which will set unduly quickly but it is not possible to mix either the resin with the two other substances or the promoter with the catalyst and still obtain a reasonable shelf life. The carriage 15 is equipped with two storage tanks, one containing a mixture of resin and catalyst and the other a mixture of resin and promoter. By suitably adjusting the mixtures and possibly adding some thinners the viscosities of the two mixtures are kept equal. From each tank a supply of mixture is led to the final soaking tank through orifices of identical size. A supply of compressed air (or other suitable gas) is also carried on the carriage and this is connected to both storage tanks which are sealed so that they can be pressurised. Thus, by regulating the pressure supply equally to both tanks equal quantities of the two mixtures are fed into the final tank, the level therein being maintained either automatically or by a human operator regulating the gas pressure as necessary. The final tank contains rollers through which the row of glass strands are led to obtain the required degree of soaking in resin, there being a final pair of squeeze rollers for the purpose of returning any surplus resin back to the tank. After leaving the squeeze rollers the strands pass through a guide in the form of a comb from where they are directly led, as a band of rovings approximately parallel to each other, towards the work being wound.

The carriage 15 is propelled to and fro between two points on the machine out beyond the ends of the work being produced. This is achieved by attaching the carriage to a link 2 of an endless roller chain 21 which runs between two sprockets 22, 23, one at the driving end which is in a fixed position and the other whose position is adjustable in the direction of length of the machine. The chain 21 is supported by rollers 29 mounted at intervals along a central rail 30. The length of the chain is adjusted to suit the chosen distance between the two sprockets. The coupling between the chain and the carriage is such that whereas the carriage performs a reversing or shuttle motion the driving chain travels round continuously in one direction. It will be appreciated that the exact position of the reversal point of the carriage is unimportant, as long as it is sufficiently far beyond the end of the cylindrical portion of the work being wound to prevent slippage of material while still in the uncured condition and at the same time is not so far beyond that point as to produce a substantially greater amount of waste than is strictly necessary. By suitably adjusting the position within these requirements and either adding or taking away the necessary number of links of the endless chain 21 it is possible to arrange that in each successive layer of the work wound the glass filaments fall into determinable positions in relation to the positions taken up in the previous layer. The method of determination will be referred to when describing the drive mechanism.

The drive mechanism (FIGS. 1 and 3) comprises an electric motor 24 with appropriate gearing 25 through which the former 12 is rotated at a moderate speed. A second output from the drive is coupled to the fixed sprocket 22 of the endless chain 21 driving the carriage 15. This second drive includes a two-speed reduction gearbox 26, a reversing gearbox 28 and transmission shafting 27. It is generally desirable to lay the band of rovings at a given angle in the workpiece being produced. To adjust the mechanism for this it is necessary to know the circumference of the work, and then the gear ratio is selected approximately to a figure such that the carriage advances sufficiently with each revolution of the work to lay the rovings at the desired angle. For the purpose of obtaining a reasonably smooth outer surface it is usual to finish the operation by carrying out the final wind at what is referred to as "zero" angle. In this phase the carriage is advanced so slowly as to produce a close wind in which, while the angle is not, in fact, zero, the pitch is less than the sum of the diameters of all the individual rovings being laid on at a single turn. This slow advance is achieved by choosing the low speed ratio in the two-speed gearbox 26. With a band of rovings, say, 9 inches wide the pitch in the final wind might be 3 inches so that approximately three layers overlapping each other are being applied. The pitch need not be controlled with any great accuracy.

The method of adjusting the pitch between successive layers is as follows: If the machine is already adjusted for a given advance of the carriage per revolution of the work the number of links in the endless chain has to be so arranged that any one link on it returns to its original position after the work has turned through the required number of complete revolutions plus that part of one revolution which will give the desired shift from one layer to the next. If the workpiece to be produced is say approximately 20 feet long the total distance to be travelled by the carriage would be approximately twice 24 feet, allowing 2 feet at each end for wrapping round the conical end pieces.

Assuming that the carriage advances six feet for one revolution of the work, if the endless chain 21 were of exactly that length as to bring each individual link back to its starting position after precisely 8 complete revolutions all successive layers would fall exactly on top of one another. However, by adding, say, two more links in the chain each layer will be displaced from the previous one by a distance determined by the length of these two links.

It will be appreciated that this adjustment is an easy matter to carry out, it only being necessary for the adjustable sprocket 23 to be placed such as to give a reasonable tension in the chain. There will be an excess overrun at the ends of the workpiece equal to the length of one link. However, an equivalent result with regard to pitch variation could have been obtained by the removal of two links, it being simply a matter of choice as to whether links are added or removed. For convenience certain links in the chain are marked such that a required total length can be made up without the necessity of having to count all the links of the chain.

The power to pull the rovings off their cheeses, through the guide tubes and soak tank and eventually on to the workpiece is supplied by the turning of the mandrel. In order to ensure that the rovings bed down properly on the mandrel and more important still in order to maintain their orderly progress from the point at which they emerge from their polythene tubes it is necessary that the rovings be under some tension. This tension is applied by the aforementioned brake device. As the rovings emerge from their polythene tubes they pass over a single cylindrical roll. On top of this there is a polythene-covered felt pad which is urged on to the roll by a weight of 150 lbs. This gives satisfactory results; the polythene surface is smooth and provides for the necessary delicacy with which particularly dry glass fibre rovings have to be handled, and felt sets as an elastic medium to even out the force exerted by the weight.

In order to lead the rovings through the soak tank and on to the mandrel in as narrow and compact a band as possible the ends of the polythene guide tubes are in two closely-spaced staggered rows. For this reason adjacent rovings enter the brake pad arrangement from slightly different directions. Before the rovings have passed through the brake there is no tension on them and obviously they are still dry. Therefore there is a tendency for occasional crossing over. An alternative arrangement that overcomes this difficulty is to pass the rovings from each row of guide tubes through a separate brake station and then to let the two streams join and mix while they are under tension. This can be achieved either by having two sets of rolls and pads, or one pad covered both on top and bottom with polythene and placed between two rolls, one fixed and one weighed as required. One row of rovings emerging from one set of polythene tubes will pass between the lower roller and the pad and the other row between the upper surface of the pad and the upper roller. The load on the two rows will automatically be kept even and at the same time the mechanical arrangement will remain compact.

The brake arrangement is close to the soak tank and from there the row of rovings has to be led down into the liquid in the tank and up again. The aforementioned squeeze rollers on the further side of the tank also conveniently act as guide rollers. In between the brake and the squeeze rollers there is at least one roll which is at least partially submerged in the liquid. Whether or not the bearings for this roll are above or below the surface of the liquid there is the problem that any liquid resin entering either bearing and remaining there would start to congeal and eventually harden. Any frictional variation of these bearings, even if the resin did not go solid altogether, would upset the tension which, if not leading to complete failure of individual rovings, would certainly produce unsatisfactory results. In order to overcome this difficulty a scoop may be employed on the bearing such that as the roll rotates fresh resin is scooped up from the tank and allowed to run into the bearing under gravity, thereby displacing any liquid resin already in the bearing. In this way the resin in the bearing is kept fresh and liquid. A simple scoop arrangement is seen in FIGS. 5 and 6 of the drawings. The cup 40 formed in the rotating bearing housing 41 scoops up a quantity of liquid at each rotation which then passes down into the bearing 42 due to the force of gravity and gently forces out of the bearing any liquid already there.

The control exercised by the squeeze rollers is of the greatest importance in order to ensure that the rovings being wound on to the mandrel carry with them neither too much nor too little resin. The top roll is allowed to rest upon the wet rovings under its own weight, and it has been found that an aluminium roll gives good results. Aluminium is not affected chemically by the resin and is of the correct weight, a steel roll being too heavy. Whereas a three inch diameter roll has been found satisfactory, slightly larger and slightly smaller diameter rolls may be used as required by the nature of the work undertaken. Thus the method of control to ensure the right amount of resin being applied to the workpiece is by the quick replacement of the squeeze roll with a slightly larger or smaller one.

If a smoother finish to the tank exterior is desired than can be obtained by the final wind as described a light grinding operation may be performed after the resin has hardened sufficiently, by means of a grinding attachment carried on the carriage. This attachment can be hinged to the carriage in such a fashion that it can be brought to a position in which it rests upon the surface of the work on rollers thereby to follow the contour of the tank. The attachment is transversed by the normal movement of the carriage.

As previously mentioned the mandrel or former 12 is split (FIG. 4), and a gap is maintained between the halves 43, as at 44. The main purpose of the gap is to allow the mandrel to be contracted slightly to assist removal from the finished work. However, it also leads to the possibility that by varying the width of the gap the same mandrel can be employed to wind tanks of different cross sections and more particularly of different capacities per unit length of tank. This is important since the mandrels are expensive and also would create a considerable storage problem if a large stock for different tank capacities had to be carried.

As already mentioned, workpieces of non-circular cross section, e.g. oval, or sometimes between oval and polygonal, can be successfully produced. In the case of non-circular sections the end pieces need not necessarily be accurately shaped but can be made in the form of a succession of approximately conical surfaces leading generally towards an apex lying on the centre of rotation.

It has been mentioned that, at the ends of the work, the windings are permitted to run over on to conical end pieces of the former so as to prevent slippage of the work. If desired, the end pieces may be provided with outwardly-projecting pins, for example in a row at or near the base of each cone, to ensure the desired result.

Since the number of individual rovings is normally large, and each has to be threaded separately through its polythene guide tube when the machine is initially set up, the operation could be long and tedious in the absence of special measures to alleviate it. In the preferred method, each roving has attached to it a small lead pellet in the form of a ball with a nick in it to receive the filament, the lead being closed over the filament to give a firm attachment. The ball is then dropped into the funnel mouth of the appropriate guide tube and is forced through the tube by a jet from an air gun, pulling the roving with it. This cuts down the time for threading to a fraction of that otherwise necessary.

What we claim is:

1. A winding machine for the manufacture of hollow vessels by laying resin-soaked reinforcing filaments on to a former in successive layers, comprising a former mounted for rotation about a horizontal axis, power drive means to rotate the former, a track-way extending parallel to the former axis alongside the former, a carriage mounted to traverse in a reciprocating manner along the track-way, a drive assembly to reciprocate the carriage which drive assembly is coupled to said power drive means and is selectable as regards its output speed ratio to the rotary drive of the former, said drive assembly having, as a final drive element connected to the carriage, an endless chain of adjustable length extending along the track-way and coupled to the carriage by coupling means causing the carriage to reciprocate when the chain is driven continuously in one direction, a filament soak tank on the carriage to which separate balanced feeds are delivered from two pressurized storage tanks, a plurality of cheese containers disposed on a platform of the carriage and receiving individual filament supply cheeses inserted therein on end, and a plurality of floor openings in the platform with separate guide tubes of synthetic plastic material, each guide tube having one end connected to the platform at a respective floor opening and leading first downwardly from said floor opening under the platform and then turning to extend approximately horizontally toward an individual entry to the soak tank, the filaments from the cheeses being led up over guides and then separately down into respective individual platform floor openings and then separately along enclosed paths within respective individual guide tubes to emerge from said guide tubes in substantially horizontal paths adjacent respective individual soak tank entries.

2. A winding machine according to claim 1, wherein one storage tank contains uncured resin mixed with catalyst and the other contains uncured resin mixed with promoter or accelerator.

3. A machine according to claim 1, wherein the length of the drive chain is adjusted by inserting or removing links, and the chain extends between two sprockets at least one of which is adjustable in position.

4. A machine according to claim 1, wherein the two storage tanks are pressurised from a single gas pressure source, enabling both feeds to the soak tank to be regulated by means of a single control valve.

5. A machine according to claim 1, wherein the filaments from the guide tubes pass through a tensioning brake device before entry to the soak tank.

6. A machine according to claim 5, wherein the brake device comprises a roller and a plastic-covered felt pad which urges the filaments against the roller.

7. A machine according to claim 1, wherein the filaments leaving the soak tank pass through squeeze rollers and thence to a guide comb that directs them on to the former as a band of rovings approximately parallel to one another.

8. A machine according to claim 7, wherein between their entry points to the soak tank and the squeeze rollers the filaments pass around a guide roller or rollers at least partially submerged in the resin, and the guide roller bearings are such as to be lubricated with liquid resin which is repeatedly changed automatically as the roller rotates in order to prevent resin congealing in the bearings.

9. A machine according to claim 1, wherein the former is split longitudinally.

10. A machine according to claim 1, wherein the former is mounted in end bearings one of which is movable to allow the use of formers of different lengths.

11. A machine according to claim 1, wherein the former is fitted with tapering end pieces.

12. A machine according to claim 11, wherein outwardly-projecting pins are provided around the base of each tapering end piece.

References Cited

UNITED STATES PATENTS

| | | | |
|---|---|---|---|
| 2,787,314 | 4/1957 | Anderson. | |
| 2,814,329 | 11/1957 | Sitton | 156—429 X |
| 3,112,234 | 11/1963 | Krupp | 156—169 |
| 3,112,895 | 12/1963 | Kinney | 156—425 X |
| 3,307,998 | 3/1967 | Boggs | 156—425 X |
| 3,379,591 | 4/1968 | Bradley | 156—173 |

JOHN T. GOOLKASIAN, Primary Examiner

R. A. KILLWORTH, Assistant Examiner

U.S. Cl. X.R.

156—449, 457, 458